United States Patent
Takahashi et al.

(10) Patent No.: US 6,677,543 B2
(45) Date of Patent: Jan. 13, 2004

(54) TURN SIGNAL SWITCH DEVICE FOR AUTOMATICALLY RESTORING OPERATING LEVER FROM OPERATING POSITION TO NEUTRAL POSITION

(75) Inventors: Atsuo Takahashi, Miyagi-ken (JP); Takehiko Ito, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/272,862

(22) Filed: Oct. 17, 2002

(65) Prior Publication Data

US 2003/0075425 A1 Apr. 24, 2003

(30) Foreign Application Priority Data

Oct. 19, 2001 (JP) .................................. 2001-322018

(51) Int. Cl.$^7$ ................................................. H01H 3/16
(52) U.S. Cl. ................................... 200/61.3; 200/61.35
(58) Field of Search ............................ 200/61.3, 61.27, 200/61.31, 61.32, 61.33, 61.35, 61.54, 61.76

(56) References Cited

U.S. PATENT DOCUMENTS

| | | | | |
|---|---|---|---|---|
| 3,892,932 A | * | 7/1975 | Erdelitsch et al. | 200/61.27 |
| 4,855,542 A | * | 8/1989 | Furuhashi et al. | 200/61.27 |
| 5,030,802 A | * | 7/1991 | Noro | 200/61.27 |
| 5,646,384 A | * | 7/1997 | Noro et al. | 200/61.3 |
| 5,949,040 A | | 9/1999 | Hayakawa et al. | |
| 5,994,653 A | * | 11/1999 | Poleshuk et al. | 200/61.3 |
| 6,194,676 B1 | | 2/2001 | Takahashi et al. | |
| 6,237,437 B1 | * | 5/2001 | Takahashi | 74/484 R |
| 6,333,475 B1 | * | 12/2001 | Kontani | 200/61.34 |
| 6,472,623 B1 | * | 10/2002 | Hayashi | 200/61.27 |

* cited by examiner

*Primary Examiner*—Elvin Enad
*Assistant Examiner*—Lisa Klaus
(74) *Attorney, Agent, or Firm*—Brinks Hofer Gilson & Lione (57) ABSTRACT

The turn signal switch device is provided with: a housing; an operating lever rotatably supported by the housing; a first cancel lever which is rotated by abutting a cancel protrusion on a steering wheel side; and a second cancel lever rotatable in interlock with the first cancel lever, wherein a protrusion shaft or an elongated hole of the second cancel lever is inserted in an elongated hole or the protrusion shaft provided in a bottom plate of the housing, and wherein in order that both ends may be exposed in the elongated hole, the protrusion shaft is caught between both ends of the second spring mounted to the bottom plate or the second cancel lever to be held at a central position of the elongated hole.

16 Claims, 7 Drawing Sheets

TURN SIGNAL SWITCH DEVICE FOR AUTOMATICALLY RESTORING OPERATING LEVER FROM OPERATING POSITION TO NEUTRAL POSITION

BACKGROUND OF THE INVENTION

1. Field of the Invention

The present invention relates to a turn signal switch device attached to a steering column or the like of an automobile and serving as a direction indicator and, more specifically, it relates to a mechanism for releasing an excess load when, in a cancel operation for automatically restoring an operating lever provided in the turn signal switch device from an operating position to a neutral position, an external force preventing the automatic restoring is applied to the operating lever.

2. Description of Related Art

In the turn signal switch device of an automobile, the base end of an operating lever is rotatably supported by a housing integrally formed with the steering column or the like, and the forward end of this operating lever is rotated from a neutral position to a right or left direction indicating position, whereby a right-turn or left-turn lamp is caused to blink. In such a turn signal switch device, to retain the operating lever at three positions of the right and left direction indicating positions and the neutral position, the inner surface of the housing is provided with a cam surface, and the operating lever is provided, through the intermediation of a spring, with a pressurizing member to be engaged with the cam surface. Further, there is provided a cancel mechanism for automatically restoring the operating lever to the neutral position when the steering wheel is turned in a returning direction which is a direction opposite to the indicated direction, with the operating lever rotated to the right or left direction indicating position.

Figure 6:
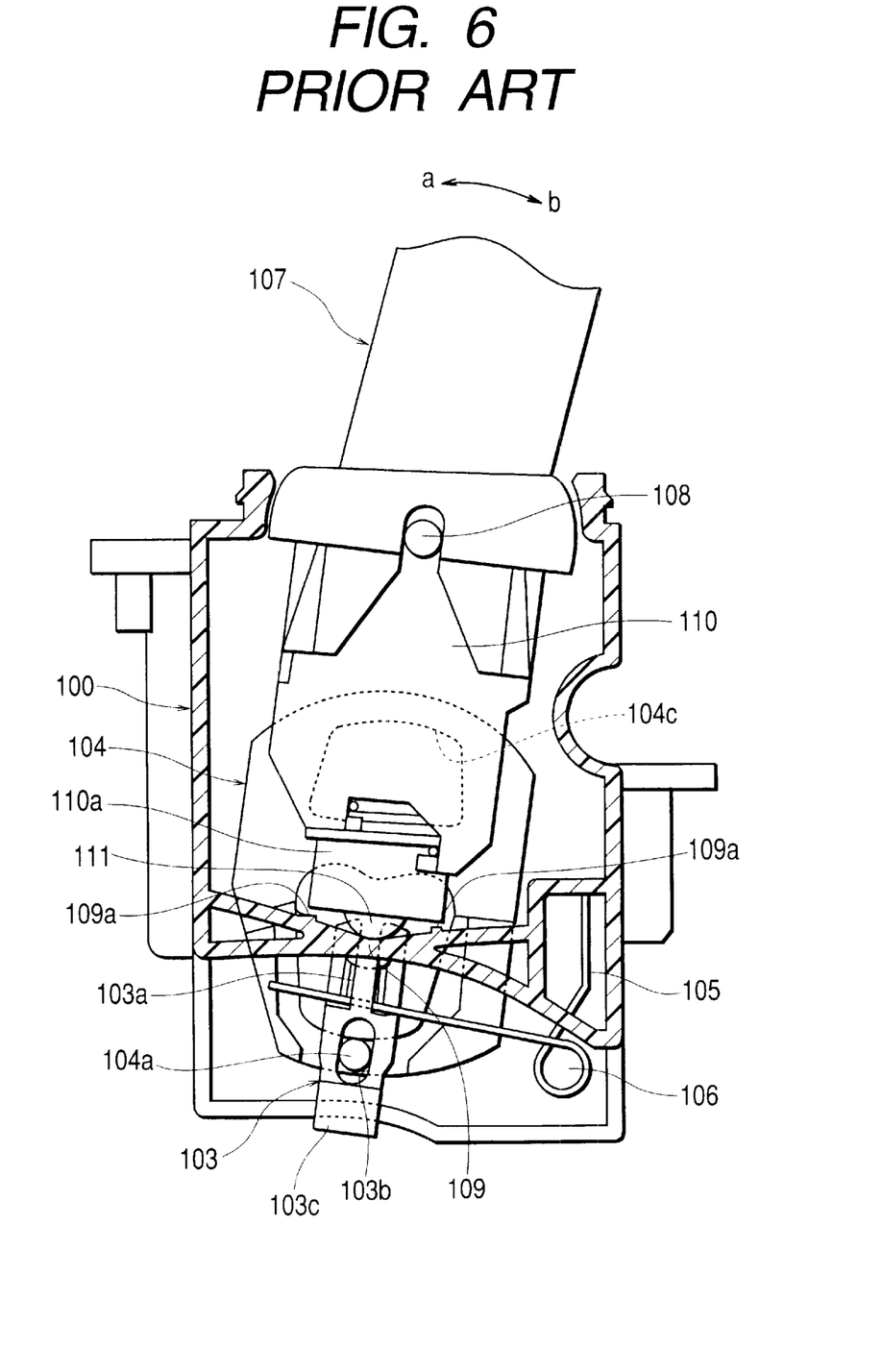
FIG. 6 is a transverse sectional view schematically showing the structure of a conventional turn signal switch device.
Figure 7:
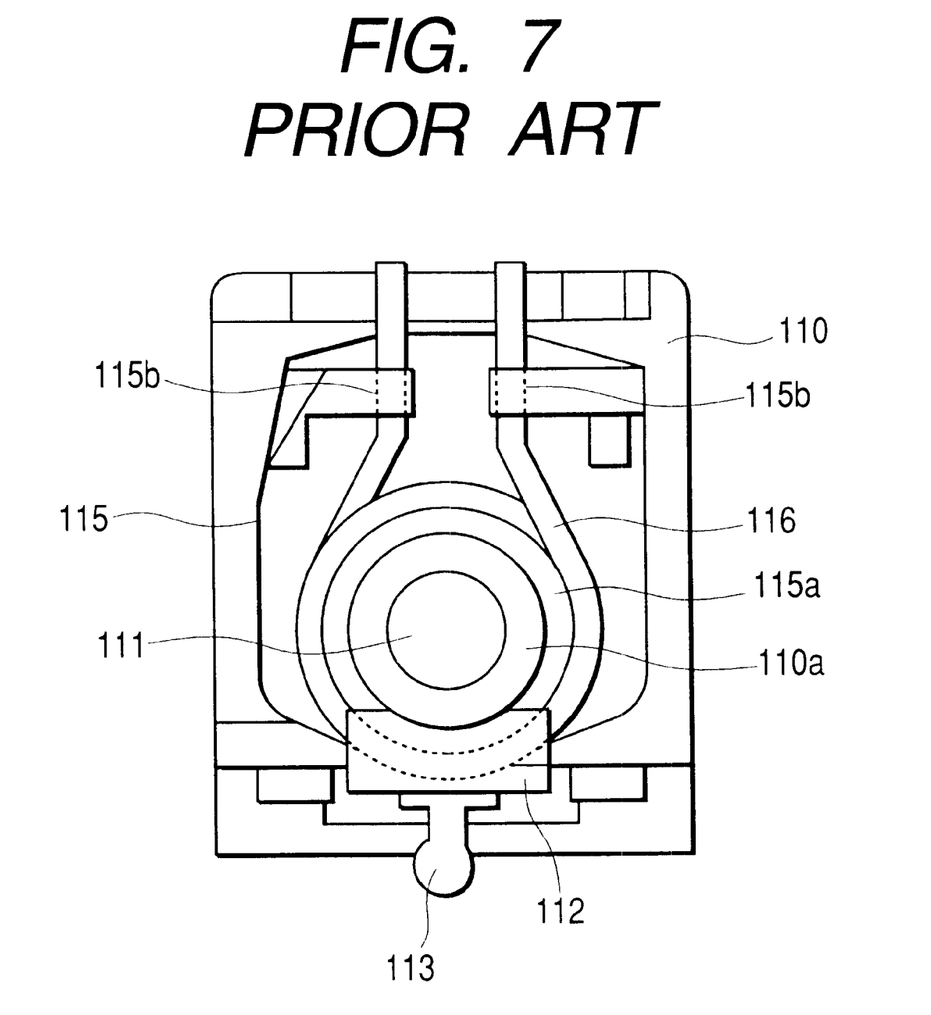
FIG. 7 is a front view showing a movable member to be provided in the conventional turn signal switch device.

The description will be made of drawings showing such a cancel mechanism according to the prior art. FIG. 6 is a cross sectional view schematically showing the construction of the turn signal switch device; FIG. 7 is a front view of a movable member provided in the turn signal switch device; and FIGS. 8A and 8B are schematic diagrams illustrating the operation of a cancel mechanism provided in the turn signal switch device.

Figure 8A:
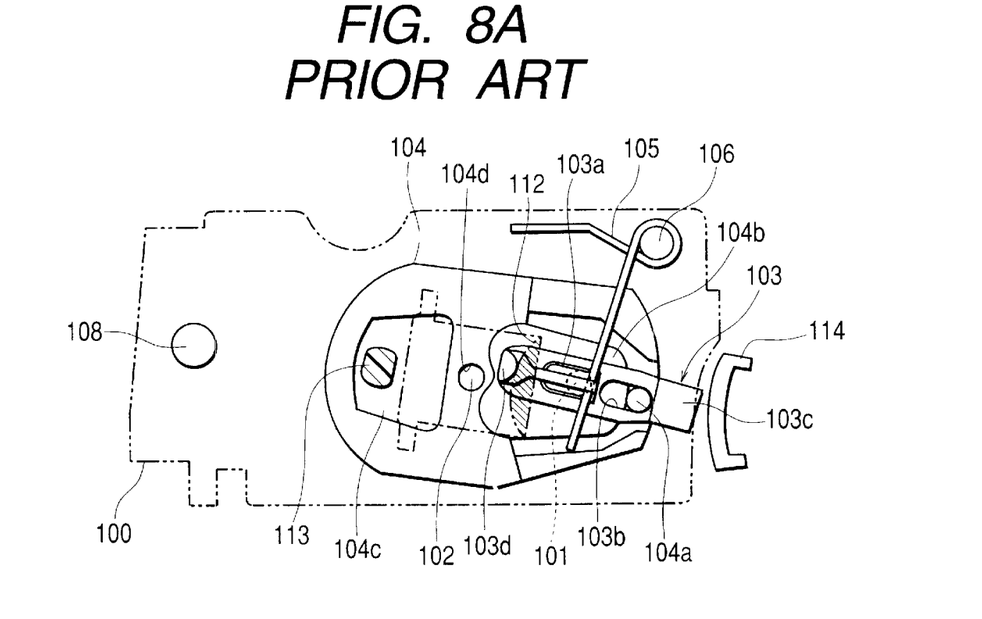
FIG. 8 is a diagram illustrating the operation of a cancel mechanism to be provided in the conventional turn signal switch device.
Figure 8B:
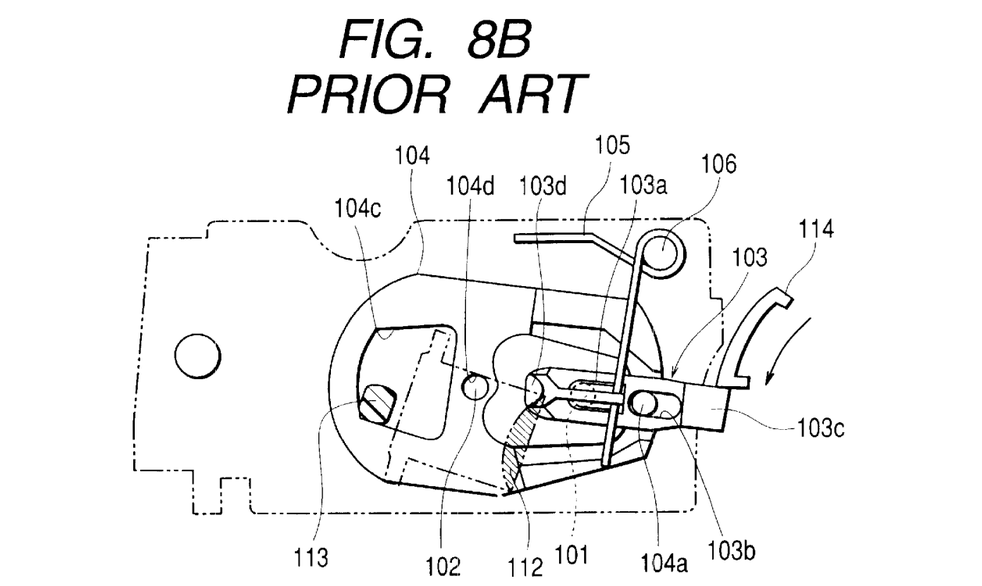

With reference to FIGS. 6 to 8, the description will be made of the turn signal switch device according to the prior art. A housing 100 is substantially box-shaped, made of insulating resin, and is secured to a column (not shown), which is a stator member of a steering device, and the like. On the bottom surface of the housing 100, a guide shaft 101 and a support shaft 102 are formed to protrude at a predetermined interval, and at the end of the bottom surface, a cylindrical protrusion 106 is provided. Also, inside the housing 100, there is formed a V-shaped cam surface 109 having a pair of lock portions 109a on the right and left sides.

A second lever member 104 is made of insulating resin; has an outside shape being substantially rectangular; has a first opening 104b and a second opening 104c; between these two openings, there is provided a shaft hole 104d; and at the outer end of the first opening 104b, a connection pin 104a is formed. A shaft hole 104d of the second lever member is rotatably fitted in a support shaft 102 provided in the bottom surface of the housing 100.

The first lever member 103 is made of insulating resin, is square bar-shaped, and has a first elongated hole 103a and a second elongated hole 103b which are arranged in a line in the longitudinal direction. Further, at the front and rear ends of the first lever member 103 in the longitudinal direction, there are provided an abutting portion 103c and a cam 103d respectively, the cross sectional configuration of the cam 103d being semi-circular. The first elongated hole 103a of the first lever member 103 is slidably fitted in the guide shaft 101 formed on the bottom surface of the housing 100, and the second elongated hole 103b is slidably fitted in a connection pin 104a provided in the second lever member 104 to connect the first lever member 103 with the second lever member 104.

In a torsion coil spring 105, wire formed of elastic material is wound several turns, both ends are left in a straight line state, the wound portion is fitted in and fixed to a protrusion 106 of the housing 100, one of the straight line-shaped portions at both ends is fixed to the end of the bottom surface of the housing 100, and the other is engaged with the first lever member, whereby the first lever member 103 is adapted to be elastically biased in the direction that goes away from the second lever member 104 in the longitudinal direction of the first lever member 103.

A holder 110 is a structure made of insulating resin, is mounted within the housing 100, has support shafts 108 at both ends, and is provided with a cylinder 110a protruding, on the front side. Inside the cylinder 110a, a driving member 111 is slidably held, and the forward end of this driving member 111 is constantly held in press contact with the cam surface 109 of the housing 100 by a spring (not shown).

An operating lever 107 is made of insulating resin, is substantially cylindrical, the base end is fitted in support shafts 108 at both ends of the holder 110, and is supported by the housing 100 so as to be rotatable together with the holder 110 in the direction indicated by the arrow a or b.

A movable member 115 is constructed such that, at the center of a rectangular plate member made of insulating resin, there is integrally provided a cylinder portion 115a vertically to the plate member; at the top end, there are provided a pair of engagement claws 115b; the wound portion of a return spring 116 wound is wound around the cylinder portion 115a; and both arms of the return spring 116 are restrained by a pair of engagement claws 115b and 115b. Inside the cylinder portion 115a, a cylinder 110a of the holder 110 is rotatably housed. The both arms of the return spring 116 are restrained by a pair of engagement claws 115b and 115b and engaged with the holder 110, whereby the movable member 115 is constantly biased toward a predetermined stable position with respect to the holder 110. Therefore, normally the rotation of the operating lever 107 rotates integrally the movable member 115 together with the holder 110. Further, the movable member 115 is provided with a cam 112 having a semi-circular cross sectional configuration and a receiving portion 113, and the cam 112 is opposed to the cam 103d of the first lever member 103, the receiving portion 113 protruding in the second opening 104c of the second lever member 104.

Next, the description will be made of an operation of the turn signal switch device, constructed as described above. When the operating lever 107 is at the neutral position, the forward end of the driving member 111 abuts the central valley of the cam surface 109, and is stably held at the position by the elasticity of a spring (not shown). At this time, as shown in FIG. 8A, the cam 112 of the movable member 115 on the operating lever 107 side and the cam 103d of the first lever member 103 are in contact with each other at their apexes, and the first lever member 103 retracts against the biasing force of the torsion coil spring 105. Thus, the abutting portion 103c of the first lever member 103 is positioned outside the rotation path of a cancel protrusion 114 rotating with the steering wheel; even if the steering wheel is turned in this state, the cancel protrusion 114 does not abut the abutting portion 103c of the first lever member 103, and the operating lever 107 is maintained at the neutral position.

When the operating lever 107 is rotated from this neutral position in the direction of the arrow a or the arrow b in FIG. 6, the forward end of the driving member 111 moves over the slope of the cam surface 109 and is engaged with the lock portion 109a, and stably held at the position by the lock portion 109a. For example, when the operating lever 107 is rotated in the direction of the arrow b in FIG. 6, the movable member 115 integrally rotates in interlock with that, and the cam 112 and the receiving portion 113 of the movable member 115 are displaced from the position shown in FIG. 8A to that shown in FIG. 8B. As a result, the cam 112 is detached from the apex of the cam 103d of the first lever member 103, and the first lever member 103 receives the elastic force of the torsion coil spring 105 to advance along the longitudinal direction of the both elongated holes 103a and 103b, the abutting portion 103c advancing into the rotation path of the cancel protrusion 114. Further, with the rotation of the operating lever 107 in the direction of the arrow b, switching operation is effected on a contact (not shown), and the right-hand turn lamp blinks.

When the steering wheel is turned in the opposite direction (the direction of the arrow in the drawing) in the right-hand turn state shown in FIG. 8B, the cancel protrusion 114 abuts the abutting portion 103c of the first lever member 103 during the return operation. As a result, the first lever member 103 rotates clockwise as seen in the drawing around the guide shaft 101, and the torque is transmitted from the second elongated hole 103b to a second lever member 104 through a connection pin 104a, and the second lever member 104 rotates clockwise around the support shaft 102, so that the second opening 104c of the second lever member 104 is rotated and displaced upward as seen in the drawing. As a result, the periphery of the second opening 104c upwardly pressurizes the receiving portion 113 of the movable member 115, so that the driving member 111 is detached from the lock portion 109a of the cam surface 109 and moves toward the central valley, and the operating lever 107 and the first and second lever members 103 and 104 are automatically restored to the neutral position shown in FIG. 8A.

At this time, when some force preventing the automatic restoration is applied to the operating lever 107 in the right-hand turn state shown in FIG. 8B, for example, when the steering wheel is turned in the opposite direction with the operating lever 107 being pressed by the driver, the periphery of the second opening 104c upwardly pressurizes the receiving portion 113 of the movable member 115 as described above. However, the operating lever 107, which is being pressed, is not automatically restored. In this case, the movable member 115 rotates the peripheral surface of the cylinder 110a of the holder 110 from the stable position to the retracted position against the biasing force of the return spring 116. And, when the cancel protrusion 114 passes the abutting portion 103c of the first lever member 103, the movable member 115 is automatically restored from the retracted position to the stable position by the biasing force of the return spring 116, so that it is maintained in the right-hand turn state shown in FIG. 8B again.

In the above-described conventional turn signal switch device, when some force preventing automatic restoration is applied to the operating lever 107 when automatically restoring the operating lever 107 from the operating position to the neutral position, an excess load generated between the second opening 104c of the second lever member 104 and the receiving portion 113 of the movable member 115 is released (absorbed) by the rotation of the movable member 115, so that it is possible to prevent breakage of the power transmission system including the first and second lever members 103 and 104 and the receiving portion 113. However, to install such a mechanism, it is necessary to provide the rotatable movable member 115 and the return spring 116 which elastically biases the movable member 115 toward the stable position, and the number of parts increases due to the movable member 115 and the return spring 116. Further, due to the mounting space for the movable member 115 and the return spring 116, the size of the turn signal switch device is enlarged.

SUMMARY OF THE INVENTION

Therefore, it is an object of the present invention to provide a small-sized turn signal switch device easy to assemble by reducing the number of parts.

In accordance with the present invention, there is provided a turn signal switch device comprising: a housing equipped with a cancel protrusion outward which rotates in accordance with a steering wheel operation; a cam surface formed within the housing; first biasing means for applying a biasing force toward the cam surface; a holder rotatably mounted to the housing; an operating lever integrally provided in the holder and provided extending outwardly of the housing; a first cam integrally provided in the holder; a second cam which abuts the first cam in a direction toward a rotation path of the cancel protrusion; a first cancel lever integrally formed in the second cam, which is engaged with and mounted to the housing so as to be displaceable and rotatable until the rotation path of the cancel protrusion is reached; second biasing means which applies a biasing force so as to displace the first cancel lever in accordance with a displacement in an abutted position between the first cam and the second cam toward the rotation path of the cancel protrusion; and a second cancel lever which is rotatably engaged with each of the first cancel lever and the housing so as to rotate in the same direction as the direction of rotation of the first cancel lever in interlock with the rotation of the first cancel lever, wherein the second cancel lever is engaged with and mounted to the holder in such a manner that a direction of rotation of the second cancel lever is opposite to that of the holder, and wherein a center of rotation of the second cancel lever with respect to the housing is made displaceable within a predetermined range from a neutral position and the center of rotation displaced is made automatically restorable to the neutral position.

According to this structure, it is possible to provide a small-sized turn signal switch device which is capable of reducing the number of parts and easy to assemble.

Also, the structure is arranged such that the center of rotation of the second cancel lever is a protrusion shaft or an elongated hole, the protrusion shaft or the elongated hole is inserted into an elongated hole or a protrusion shaft provided in a bottom plate of the housing, and is caught between both ends of a spring mounted to the bottom plate or the second cancel lever in order that the both ends may be exposed in the elongated hole to hold the protrusion shaft at a central position of the elongated hole; the operating lever is caused to be automatically restored from an operating position to the neutral position in interlock with the rotating operation of the first and second cancel levers in such a state; and when an excess load for preventing automatic restoration from the operating position to the neutral position is applied to the operating lever, the protrusion shaft is moved from the central position of the elongated hole to the end position against a resilient force of the spring, whereby the first and second cancel levers are allowed to rotate.

According to this structure, it is possible to reduce the number of parts and to provide a small-sized turn signal switch device easy to assemble.

Also, the structure is arranged such that the center of rotation of the second cancel lever is a rotating shaft, which is a protrusion shaft; the rotating shaft is inserted into an elongated hole provided in the bottom plate of the housing and is caught between both ends of a spring mounted to the bottom plate in order that the both ends are exposed in the elongated hole to hold the rotating shaft at a central position of the elongated hole; the operating lever is caused to be automatically restored from the operating position to the neutral position in interlock with rotating operation of the first and second cancel levers in such a state; and when an excess load for preventing automatic restoration from the operating position to the neutral position is applied to the operating lever, the rotating shaft is moved from the central position of the elongated hole to an end position against the resilient force of the spring, whereby the cancel levers are allowed to rotate.

According to this structure, it is possible to reduce the number of parts, and to provide a small-sized turn signal switch device easy to assemble.

Also, the spring is provided on a protruded portion on a back surface side of the bottom plate, and between both ends of the spring, a stopper member having the substantially same width as a diameter of the rotating shaft which is provided on the back surface side of the bottom plate and the rotating shaft are caught.

According to this structure, since the back surface side of the bottom plate is used, it is easy to secure space for forming the protruded portion and the stopper member.

Also, the spring is a coil spring having straight lines at the both ends respectively, and between the both ends, the rotating shaft and a stopper member having the substantially same width as the diameter of the rotating shaft are caught.

According to this structure, since a general coil spring is used, it is easy to handle.

Also, the stopper member is a wall, and this wall is provided between the elongated hole and the protruded portion integrally with the bottom plate.

According to this structure, since the wall, which is a stopper member, is between the elongated hole and protruded portion, it is easy to mount by engaging the spring with the stopper member.

Also, the first biasing means is a coil spring.

According to this structure, since a general coil spring is used, it is easy to handle.

Also, the cam surface is shaped like a letter V.

According to this structure, the member pressurized easily takes a neutral position because of the shape of the letter V.

DETAILED DESCRIPTION OF THE PREFERRED EMBODIMENTS

Figure 1:
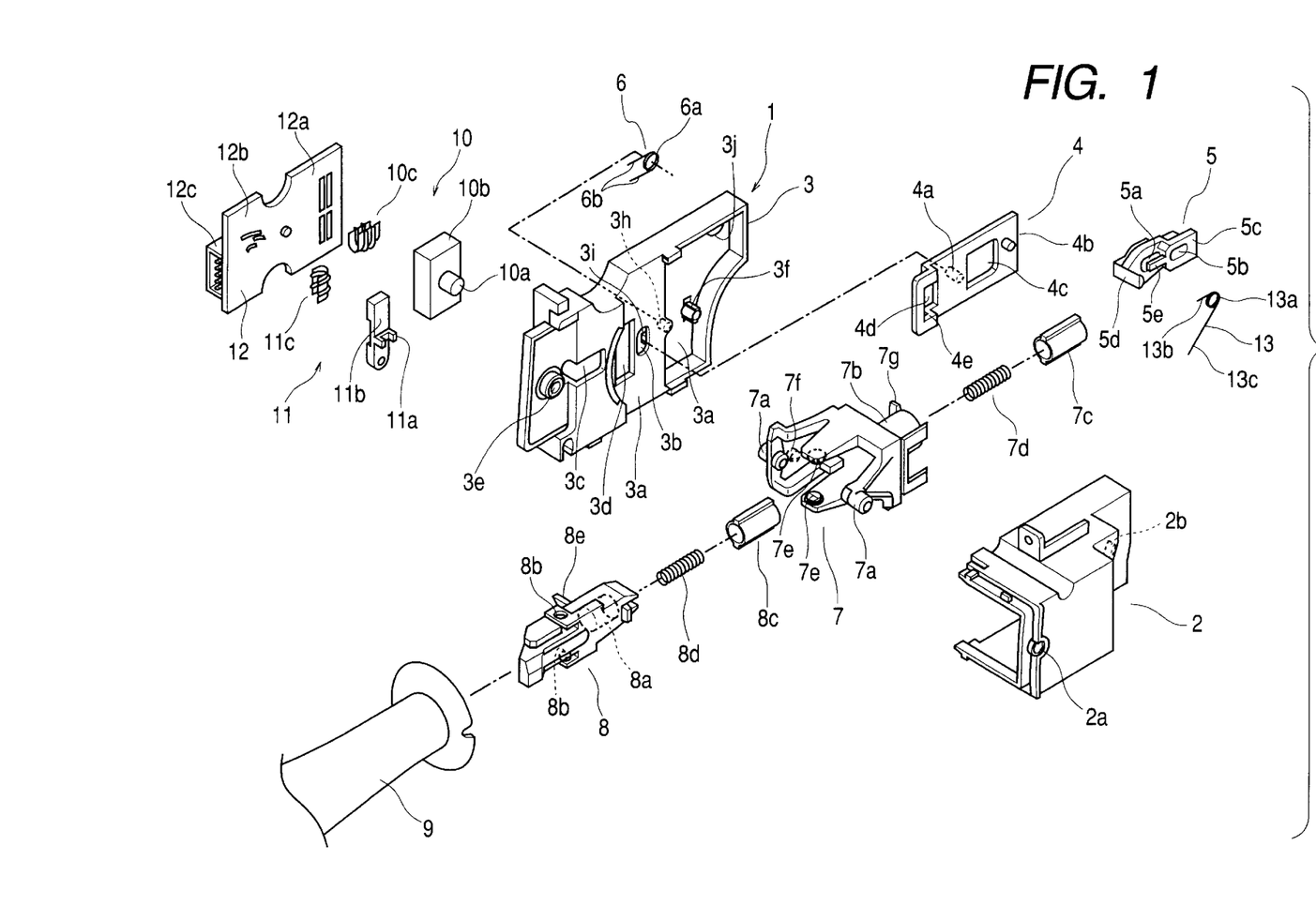
FIG. 1 is an exploded perspective view of a turn signal switch device according to an embodiment of the present invention.
Figure 2:
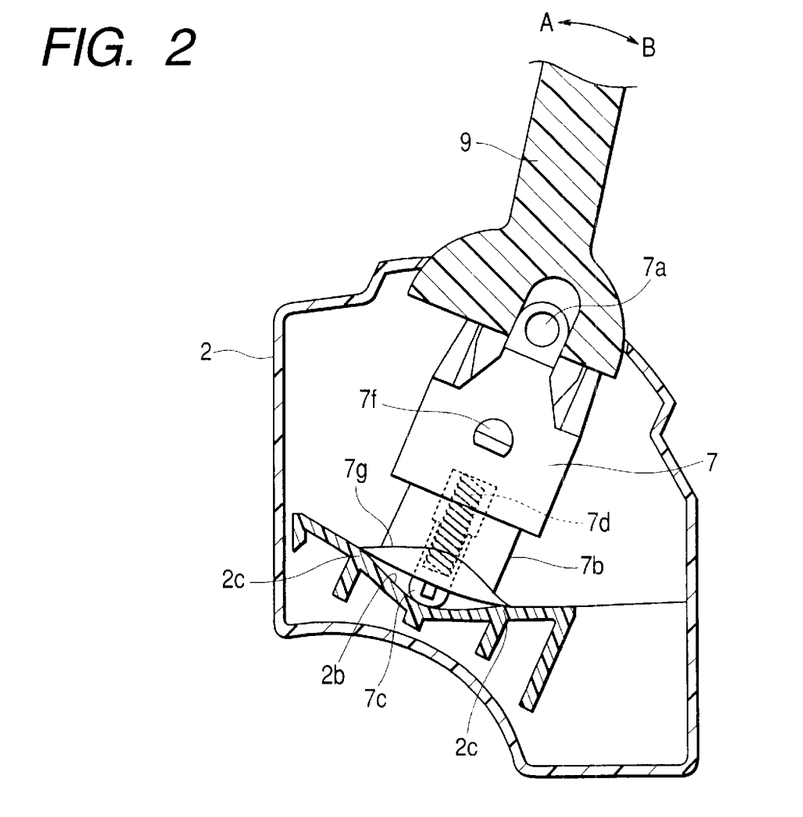
FIG. 2 is a longitudinal sectional view of the turn signal switch device according to the embodiment of the present invention.
Figure 3:
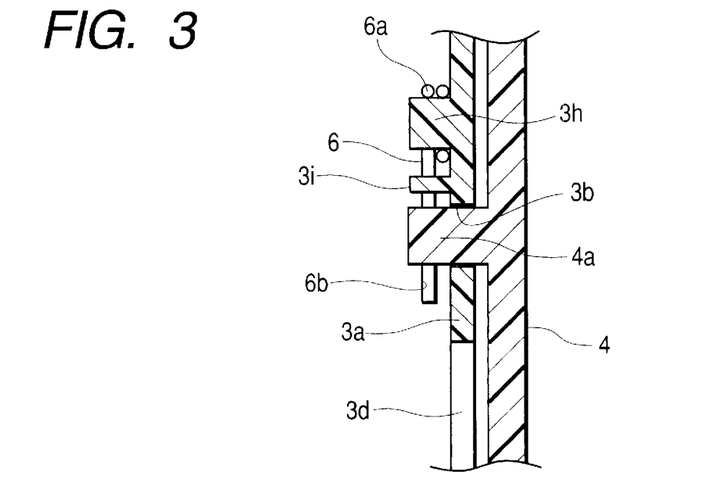
FIG. 3 is a transverse sectional view showing a main portion of the turn signal switch device according to the embodiment of the present invention.
Figure 4A:
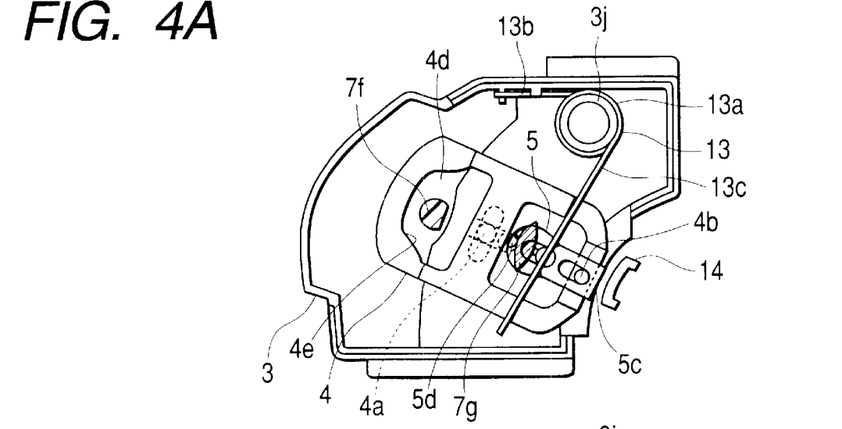
FIG. 4 is a diagram illustrating the operation of the turn signal switch device according to the embodiment of the present invention.

The description will be made of the drawings of the turn signal switch device according to the present invention. FIG. 1 is an exploded perspective view of a turn signal switch device according to an embodiment of the present invention, FIG. 2 is a longitudinal sectional view of the turn signal switch device according to the embodiment of the present invention, FIG. 3 is a transverse sectional view showing a main portion of the turn signal switch device according to the embodiment of the present invention, FIG. 4 is a diagram illustrating the operation of the turn signal switch device according to the embodiment of the present invention, and FIG. 5 is a partial enlarged view showing the turn signal switch device according to the embodiment of the present invention (diagram illustrating the operation).

Next, with reference to FIGS. 1 to 5, the description will be made of embodiments of the present invention. A housing 1 is formed of a first case 2 and a second case 3 which are made of insulating resin, and both cases 2 and 3 are fitted in to constitute the housing 1. The first case 2 has a V-shaped cam surface 2b having a pair of protruded portions 2c and 2c on the right and left sides inside, and has a shaft hole 2a at the end of the wall surface. The second case 3 has, on the surface side of the bottom plate 3a, an elongated hole 3b, two rectangular operating holes 3c and 3d, a shaft hole 3e, a protrusion 3j and a guide shaft 3f, and on the back surface side of the bottom plate 3a, there is formed a pin 3h, which is a cylindrical protruded portion, and between the pin 3h and the elongated hole 3b, there is projectingly formed a wall-shaped stopper member 3i.

The second cancel lever 4 is a plate member made of insulating resin, has an outside shape being substantially rectangular, and has a first opening 4c and a second opening 4d having a periphery 4e; on the back surface side between two openings 4c and 4d, there is provided a protrusion shaft 4a; and on the surface side at the outside end of the first opening 4c, there is formed a connection pin 4b. The protrusion shaft 4a of the second cancel lever 4 is slidably and rotatably inserted into the elongated hole 3b of the second case 3 as a rotating shaft.

The first cancel lever 5 is made of insulating resin, is square bar-shaped, and has a first elongated hole 5a and a second elongated hole 5b which are arranged in a line in the longitudinal direction. Further, at the front and rear ends of the first cancel lever 5 in the longitudinal direction, there are provided an abutting portion 5c and a second cam 5d respectively, the cross sectional configuration of the second cam 5d being semi-circular. On the first cancel lever 5 is formed a rod-shaped protrusion 5e in opposite to the first elongated hole 5a. The first elongated hole 5a of the first cancel lever 5 is slidably fitted in the guide shaft 3f formed on the surface side of the bottom plate 3a of the second case 3 of the housing 1 within the first opening 4c of the second cancel lever 4, and the second elongated hole 5b is inserted into a connection pin 4b provided at the outside end of the second cancel lever 4 to connect the first cancel lever 5 with the second cancel lever 4.

A spring 6 is constructed such that wire made of elastic material is wound like a coil, and its both ends are drawn out from the wound portion 6a in equal length in a straight line shape in parallel to provide two straight lines 6b and 6b. The wound portion 6a of the spring 6 is fitted in and fixed to a pin 3h of the bottom plate 3a on the back surface side; a distance between the both straight lines 6b and 6b, the length of a wall-shaped stopper member 3i protruding on the back surface side of the bottom plate 3a in the longitudinal direction, and the diameter of the pin 3h are set to the substantially same size; and the both straight lines 6b and 6b are held in the central portion of the elongated hole 3b provided in the bottom plate 3a in a bridge-constructed state. Inside the elongated hole 3b, between the both straight lines 6b and 6b, the protrusion shaft 4a of the second cancel lever 4 whose diameter is a slightly larger size than the distance between the both straight lines 6b and 6b is inserted so that the protrusion shaft 4a is elastically held at the central position of the elongated hole 3b by the both straight lines 6b and 6b.

Second biasing means 13 has a short side 13b and a long side 13c obtained by winding wire made of elastic material like a coil to draw out its both ends from the wound portion 13a in a straight-line shape. The wound portion 13a is fixed to a protrusion 3j of the second case 3, and the short side 13b is engaged with and fixed to the side wall of the second case 3. The long side 13c is engaged with a protrusion 5e of the first cancel lever 5 to bias the first cancel lever 5 in the longitudinal direction of the first cancel lever 5 so as to go away from the second cancel lever 4.

A holder 7 is a structure made of insulating resin, has a pressurizing member 7c and a first spring 7d, and, at its both ends, has support shafts 7a and 7a, and support shafts 7e and 7e to be opposed to each other in a direction perpendicular to the support shafts 7a and 7a; a cylinder 7b is formed to protrude on the front surface; and at the forward end of the cylinder 7b, a first cam 7g having a convex lens-cross sectional configuration protrudes in the perpendicular direction. Also, in the central portion of the holder 7, there is provided a protrusion 7f. The holder 7 is mounted within the housing 1; within the cylinder 7b, the pressurizing member 7c is slidably held; and the forward end of this pressurizing member 7c is constantly held in press contact with the cam surface 2b of the first case 2 of the housing 1 by a long and narrow coil-shaped first spring 7d inserted into the pressurizing member 7c. The support shafts 7a and 7a are fitted in shaft holes 2a and 3e provided in the first case 2 and the second case 3 of the housing 1 respectively to rotatably support the holder 7 with respect to the housing 1. Also, the first cam 7g having a convex lens-cross sectional configuration is engaged with the second cam 5d of the first cancel lever 5 so that the protrusion 7f is adapted to be positioned in the second opening 4d of the second cancel lever 4.

An operating member 8 is long and narrow rod-shaped made of insulating resin; has a pressurizing member 8c and the first spring 8d; at the forward end, there is provided a cylindrical hole 8a; and at the central side portion, there is provided a protrusion 8e. Inside the cylindrical hole 8a, the pressurizing member 8c is slidably held; the forward end of this pressurizing member 8c is constantly held in press contact with a cam surface (not shown) provided on the holder 7 by long and narrow coil-shaped first biasing means 8d inserted into the pressurizing member 8c. Also, the operating member 8 is provided with shaft holes 8b and 8b; the shaft holes 8b and 8b are fitted in the support shafts 7e and 7e of the holder 7; the operating member 8 is supported to be rotatable with respect to the holder 7; and the holder 7 enables to rotate in a plane substantially perpendicular to the plane which rotates with respect to the housing 1.

An operating lever 9 is made of insulating resin, is substantially cylindrical, and a base end thereof is firmly fitted in and fixed to the rear end of the operating member 8. The operating lever 9 is rotatably supported in two planes which are substantially perpendicular to each other through the operating member 8.

Contact switching members 10, 11 are composed of: operating portions 10a, 11a; bodies 10b, 11b; and movable contacts 10c, 11c, and the movable contacts 10c, 11c are attached to the bodies 10b, 11b respectively such that the operating portions 11a, 11a are driven to move the movable contact. The operating portion 10a is engaged with a protrusion wall (not shown) of the holder 7 through an operating hole 3c of the housing 1 to be driven by the rotation of the holder 7. The operating portion 11a is engaged with the protrusion 8e of the operating member 8 through the operating hole 3c of the housing 1 to be driven by the rotation of the operating member 8 with respect to the holder 7.

A printed substrate 12 has switching contacts 12a and 12b, and has, on the back surface, a connector 12c which is electrically connected through the switching contacts and wiring. The switching contacts 12a, 12b are slidably contacted by the movable contacts 10c, 11c of the contact switching members 10, 11 in such a manner as to send an ON/OFF signal depending upon movement of the movable contacts 10c, 11c.

Next, the description will be made of an operation of the turn signal switch device constructed as described above. When the operating lever 9 is at the neutral position, the forward end of the pressurizing member 7c abuts a valley at the center of the cam surface 2b, and is stably held at the position by the elasticity of the first biasing means 7d. At this time, as shown in FIG. 4A, the first cam 7g on the operating lever 9 side and the second cam 5d of the first cancel lever 5 are in contact with each other at their apexes, and the first cancel lever 5 is retracted against the biasing force of the second biasing means 13. Thus, the abutting portion 5c of the first cancel lever 5 is positioned outside the rotation path of the cancel protrusion 14 rotating with the steering wheel. Even if the steering wheel is turned in this state, the cancel protrusion 14 does not abut the abutting portion 5c of the first cancel lever 5, and the operating lever 9 is maintained at the neutral position.

When the operating lever 9 is rotated from this neutral position in the direction of the arrow A or B in FIG. 2, the forward end of the pressurizing member 7c goes over the slope of the cam surface 2b to be engaged with a protruded portion 2c, and is stably held at the position by the protruded portion 2c. When, for example, the operating lever 9 is rotated in the direction of the arrow B in FIG. 2, the holder 7 integrally rotates in interlock therewith, and the first cam 7g of the holder 7 and the protrusion 7f displace from a position indicated in FIG. 4A to a position indicated in FIG. 4B. As a result, this first cam 7g is detached from the apex of the second cam 5d of the first cancel lever 5, the first cancel lever 5 receives the elastic force of the second biasing means 13 to advance along the longitudinal direction of both elongated holes 5a and 5b, and the abutting portion 5c comes into the rotation path of the cancel protrusion 14. Thus, the holder 7 rotates clockwise around its support shaft 7a, and the pressurizing member 7c displaces downward on the cam surface 2b to go over a protruded portion 2c formed on the cam surface 2b and is stably held. Further, with the rotation of the operating lever 9 in the direction of the arrow B, the operation of the contact switching member 10 is performed to blink a right-turn lamp (not shown).

When in the right-hand turn state shown in FIG. 4A, the steering wheel is turned in the opposite direction (in the direction of the arrow in the drawing), the cancel protrusion 14 abuts the abutting portion 5c of the first cancel lever 5 during its return operation. As a result, the first cancel lever 5 rotates clockwise as seen in the drawing around the guide shaft 3f, its torque is transmitted from the second elongated hole 5b to the second cancel lever 4 through a connection pin 4b, and this second cancel lever 4 rotates clockwise around the protrusion shaft 4a. Therefore, the second opening 4d of the second cancel lever 4 is upwardly rotated and displaced in the drawing. Thereby, since the periphery 4e of the second opening 4d pressurizes the protrusion 7f of the holder 7 upwardly, the holder 7 rotates counterclockwise around its support shaft 7a, whereby the pressurizing member 7c is detached from the protruded portion 2c of the cam surface 2b to move to the valley at the center so that the operating lever 9 and the first and second cancel levers 5 and 4 are automatically restored to the neutral position shown in FIG. 4A. As shown in FIG. 5B, the protrusion shaft 4a is retained in the vicinity of the center of the elongated hole 3b by the spring 6, and even if the periphery 4e of the second opening 4d pressurizes the protrusion 7f of the holder 7 upwardly, the protrusion shaft 4a is held by the elastic force of the spring 6 in such a manner that the position of the protrusion shaft 4a does not move from the vicinity of the center of the elongated hole 3b.

Figure 4B:
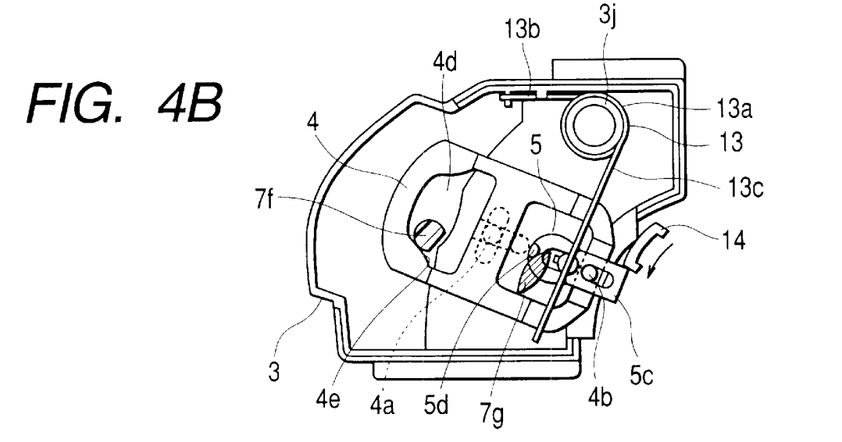
Figure 4C:
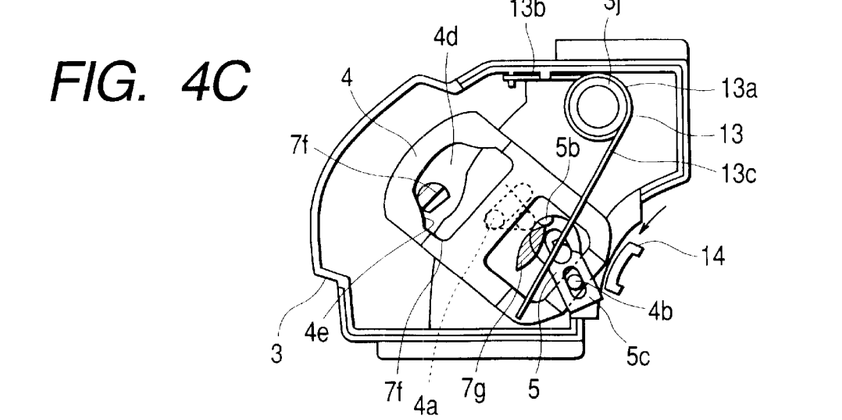
Figure 5A:
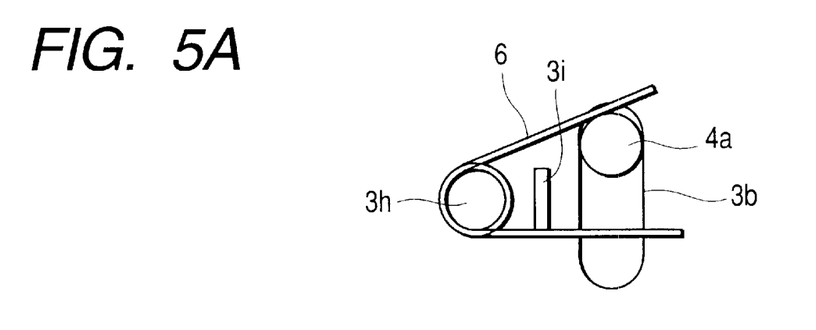
FIGS. 5A, 5B, and 5C are partial enlarged views showing the turn signal switch device according to the embodiment of the present invention (diagram illustrating the operation)
Figure 5B:
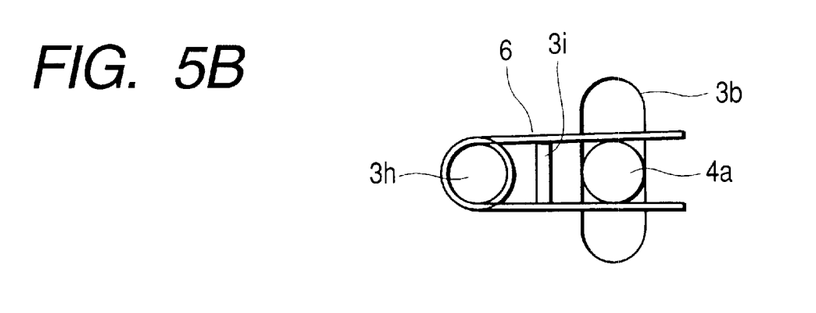
Figure 5C:
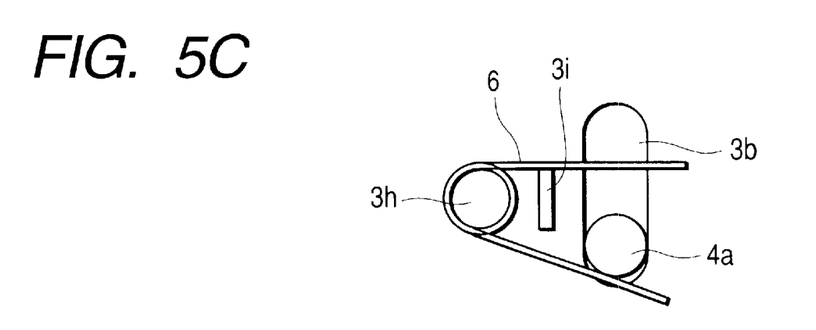

When at this time in the right-hand turn state shown in FIG. 4B some force preventing automatic restoration is applied to the operating lever 9, for example, when the steering wheel is turned in the opposite direction with the operating lever 9 being pressed by the driver, the periphery 4e of the second opening 4d pressurizes the protrusion 7f of the holder 7 upwardly as described above. However, since the operating lever 9, which is being pressed, does not move even if the protrusion 7f is pressurized, the operating lever is not automatically restored. In this case, as shown in FIGS. 4C and 5C, the protrusion shaft 4a of the second cancel lever 4 moves from the stable position to the retracted position against the biasing force of one straight line 6b of the spring 6. And, when the cancel protrusion 14 passes the abutting portion 5c of the first cancel lever 5, the protrusion shaft 4a is automatically restored from the retracted position to the stable position by the biasing force of the spring 6, so that it is maintained in the right-hand turn state shown in FIGS. 4B and 5B again.

When the operating lever is turned in the direction of the arrow A in FIG. 2 as shown in FIG. 5A, a left-hand turn state is brought about, and when in this case some force preventing the automatic restoration is applied to the operating lever 9, the protrusion shaft 4a upwardly bends one straight line 6b of the spring 6 to move to the retracted position.

In this respect, in the above-described embodiment, the second cancel lever 4 has been provided with the protrusion shaft 4a, the bottom plate 3a has been provided with the elongated hole 3b, and the spring 6 has been mounted to the bottom plate 3a, but the present invention is not limited thereto. It is possible to provide the second cancel lever 4 with an elongated hole, to provide the bottom plate with a protrusion shaft, and to mount a spring to the second cancel lever 4.

Further, in the above-described embodiment, the protruded portion 3h and the stopper member 3i have been provided on the back surface side of the bottom plate 3a, but the present invention is not limited thereto. The protruded portion and stopper member may be provided on the surface side of the bottom plate.

As described above, in accordance with the present invention, there is provided a turn signal switch device comprising: a housing equipped with a cancel protrusion outward which rotates in accordance with a steering wheel operation; a cam surface formed within the housing; first biasing means for applying a biasing force toward the cam surface; a holder rotatably mounted to the housing; an operating lever integrally provided in the holder, and provided extending outwardly of the housing; a first cam integrally provided in the holder; a second cam which abuts the first cam in a direction toward the rotation path of the cancel protrusion; a first cancel lever integrally formed in the second cam, which is engaged with and is mounted to the housing so as to be displaceable and rotatable until the rotation path of the cancel protrusion is reached; second biasing means which applies a biasing force so as to displace the first cancel lever in accordance with a displacement in an abutted position between the first cam and the second cam toward the rotation path of the cancel protrusion; and a second cancel lever which is rotatably engaged with each of the first cancel lever and the housing so as to rotate in the same direction as a direction of rotation of the first cancel lever in interlock with rotation thereof, wherein the second cancel lever is engaged with and mounted to the holder in such a manner that the direction of rotation of the second cancel lever is opposite to that of the holder, and that the center of rotation of the second cancel lever with respect to the housing is made displaceable within a predetermined range from the neutral position and the center of rotation displaced is automatically made restorable to the neutral position.

According to this structure, it is possible to provide a small-sized turn signal switch device which is capable of reducing the number of parts and easy to assemble.

What is claimed is:

1. A turn signal switch device comprising:
 a housing equipped with a cancel protrusion outward which rotates in accordance with a steering wheel operation;
 a cam surface formed within the housing; first biasing unit for applying a biasing force toward the cam surface;
 a holder rotatably mounted to the housing; an operating lever integrally provided in the holder, and provided extending outwardly of the housing;
 a first cam integrally provided in the holder;
 a second cam which abuts the first cam in a direction toward a rotation path of the cancel protrusion;
 a first cancel lever integrally formed in the second cam, which is engaged with and mounted to the housing so as to be displaceable and rotatable until the rotation path of the cancel protrusion is reached;
 a second biasing unit which applies a biasing force so as to displace the first cancel lever in accordance with a displacement in an abutted position between the first cam and the second cam toward the rotation path of the cancel protrusion; and a second cancel lever which is rotatably engaged with each of the first cancel lever and the housing so as to rotate in the same direction as a direction of rotation of the first cancel lever in interlock with the rotation of the first cancel lever, wherein the second cancel lever is engaged with and mounted to the holder such that a direction of rotation of the second cancel lever is opposite to that of the holder, and wherein a center of rotation of the second cancel lever with respect to the housing is made displaceable within a predetermined range from a neutral position and the center of rotation displaced is made automatically restorable to the neutral position, wherein the center of rotation of the second cancel lever is one of a protrusion shaft and an elongated hole; the one of the protrusion shaft and the elongated hole is inserted into the other of an elongated hole and a protrusion shaft provided in a bottom plate of the housing, and is caught between both ends of a spring mounted to one of the bottom plate and the second cancel lever such that the both ends are exposed in the elongated hole to hold the protrusion shaft at a central position of the elongated hole, wherein the operating lever is caused to be automatically restored from an operating position to the neutral position in interlock with rotating operation of the first and second cancel levers in such a state, and wherein when an excess load for preventing automatic restoration from the operating position to the neutral position is applied to the operating lever, the protrusion shaft is moved from the central position of the elongated hole to the end position against a resilient force of the spring, whereby the first and second cancel levers are allowed to rotate.

2. The turn signal switch device according to claim 1, wherein the center of rotation of the second cancel lever is a rotating shaft, which is a protrusion shaft, wherein the rotating shaft is inserted into an elongated hole provided in the bottom plate of the housing, and is caught between both ends of a spring mounted to the bottom plate such that the both ends are exposed in the elongated hole to hold the rotating shaft at a central position of the elongated hole, wherein the operating lever is caused to be automatically restored from the operating position to the neutral position in interlock with rotating operation of the first and second cancel levers in such a state, and wherein when an excess load for preventing automatic restoration from the operating position to the neutral position is applied to the operating lever, the rotating shaft is moved from the central position of the elongated hole to an end position against the resilient force of the spring, whereby the cancel levers are allowed to rotate.

3. The turn signal switch device according to claim 2, wherein the spring is provided on a protruded portion on a back surface side of the bottom plate, and wherein between both ends of the spring, a stopper member is provided such that the spring elastically holds the protrusion shaft, the protruded portion and the stopper member being provided on the back surface side or on the surface side of the bottom plate.

4. The turn signal switch device according to claim 3, wherein the stopper member is a wall, and wherein the wall is provided between the elongated hole and the protruded portion integrally with the bottom plate.

5. The turn signal switch device according to claim 3, wherein the first biasing unit is a coil spring.

6. The turn signal switch device according to claim 3, wherein the cam surface is shaped like a letter V.

7. The turn signal switch device according to claim 2, wherein the spring is a coil spring having straight lines at the both ends respectively, and wherein between the both ends, the rotating shaft and a stopper member is provided such that the spring elastically holds the protrusion shaft, the protruded portion and the stopper member being provided on the back surface side or on the surface side of the bottom plate.

8. The turn signal switch device according to claim 7, wherein the spring is a coil spring having straight lines at the both ends respectively.

9. The turn signal switch device according to claim 7, wherein the stopper member is a wall, and wherein the wall is provided between the elongated hole and the protruded portion integrally with the bottom plate.

10. The turn signal switch device according to claim 7, wherein the first biasing unit is a coil spring.

11. The turn signal switch device according to claim 7, wherein the cam surface is shaped like a letter V.

12. The turn signal switch device according to claim 2, wherein the stopper member is a wall, and wherein the wall is provided between the elongated hole and the protruded portion integrally with the bottom plate.

13. The turn signal switch device according to claim 2, wherein the first biasing unit is a coil spring.

14. The turn signal switch device according to claim 2, wherein the cam surface is shaped like a letter V.

15. The turn signal switch device according to claim 1, wherein the first biasing unit is a coil spring.

16. The turn signal switch device according to claim 1, wherein the cam surface is shaped like a letter V.

* * * * *